US006715674B2

(12) United States Patent
Schneider et al.

(10) Patent No.: US 6,715,674 B2
(45) Date of Patent: Apr. 6, 2004

(54) BIOMETRIC FACTOR AUGMENTATION METHOD FOR IDENTIFICATION SYSTEMS

(75) Inventors: John K Schneider, Snyder, NY (US); Peter Stecher, Amherst, NY (US)

(73) Assignee: Ultra-Scan Corporation, Amherst, NY (US)

( * ) Notice: Subject to any disclaimer, the term of this patent is extended or adjusted under 35 U.S.C. 154(b) by 1 day.

(21) Appl. No.: 10/228,576

(22) Filed: Aug. 27, 2002

(65) Prior Publication Data

US 2004/0041019 A1 Mar. 4, 2004

(51) Int. Cl.[7] .................................................. G06K 5/00
(52) U.S. Cl. ..................... 235/382; 709/249; 370/395.2
(58) Field of Search ............................. 235/382, 379; 709/221, 223, 227–228, 230, 238, 246, 249; 705/42, 43, 44; 710/62, 72; 370/236, 355, 395.2, 395.3

(56) References Cited

U.S. PATENT DOCUMENTS

| | | | | | |
|---|---|---|---|---|---|
| 5,815,571 | A | * | 9/1998 | Finley | 713/189 |
| 5,859,660 | A | * | 1/1999 | Perkins et al. | 725/32 |
| 5,870,723 | A | * | 2/1999 | Pare et al. | 705/39 |
| 6,363,485 | B1 | * | 3/2002 | Adams et al. | 713/186 |
| 6,523,745 | B1 | * | 2/2003 | Tamori | 235/382 |
| 6,563,793 | B1 | * | 5/2003 | Golden et al. | 370/236 |
| 6,612,928 | B1 | * | 9/2003 | Bradford et al. | 463/29 |
| 2002/0112183 | A1 | * | 8/2002 | Baird et al. | 713/201 |

FOREIGN PATENT DOCUMENTS

| | | | | |
|---|---|---|---|---|
| JP | 2001119305 A | * | 4/2001 | H03M/7/30 |

* cited by examiner

Primary Examiner—Diane I. Lee
(74) Attorney, Agent, or Firm—Hodgson Russ LLP

(57) ABSTRACT

The most preferred method of augmenting an existing token-based identification system is to splice into a data stream transmitted from a token reader to a control panel such that an acquired token factor from a user is intercepted by a biometric identification, or authentication, system that is wedged in series at a splice in the data stream. When the token reader transmits a data stream, such as a Wiegand interface, to the control panel, the data stream is used by the biometric identification system to prompt the user to present an anatomical feature to a biometric reader. The biometric reader creates a biometric inquiry template that is transmitted to a biometric search engine, along with the acquired token factor, such as a PIN or barcode, to perform data match analysis against one or more enrollment templates associated with the acquired token factor. The search engine will either match an authorized user or reject an unidentifiable user. If there is a match, then the data stream is allowed to pass from the biometric reader to the control panel of the existing token-based identification system. The existing system does not otherwise need to be modified. The security of an Access Control System (ACS) can be greatly enhanced by this method of augmentation that, preferably, wedges an automatic fingerprint identification system (AFIS) into the data stream of an established ACS.

23 Claims, 1 Drawing Sheet

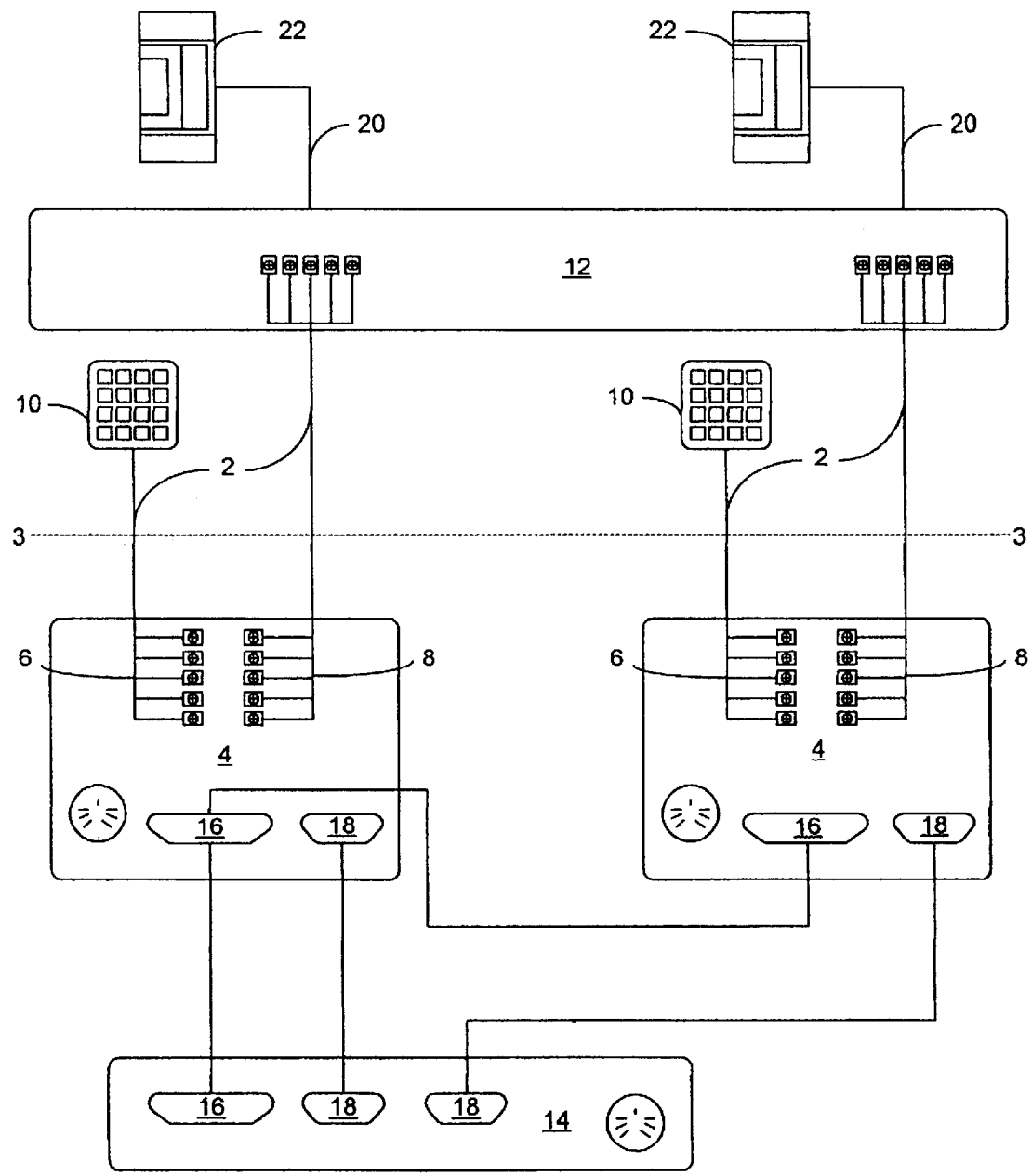

BIOMETRIC FACTOR AUGMENTATION METHOD FOR IDENTIFICATION SYSTEMS

BACKGROUND OF THE INVENTION

As the commercial world becomes increasingly technology-dependent, there is an ever-growing demand for higher-tech security. This need is currently being addressed by identification systems that utilize security factors, such as tokens or smart cards. The most common application of an identification system is for an access control system, or ACS. Security factor options have been expanded by the field of biometrics, based on the measurement and analysis of biological characteristics, such as fingerprints. Until recently, the costliness and unreliability of biometric readers has been prohibitive to their wide spread commercial use. Now, with advances in biometric technology, such as exemplified by U.S. Pat. No. 6,363,485, increased fidelity of identification has been attained for biometric factors, which are capable of providing a highly individualized and complex form of identification that may be used as the only factor in an identification system, or with multi-factor identification systems that utilize biometric factors. However, the cost-effectiveness of completely replacing an already established token-based identification system has proven to be an obstacle to implementing and using new biometric security systems. Thus, the invention presented in this specification is intended to demonstrate viable options for efficiently coupling an organization's already established token-based identification system to a biometric identification system.

Token-based identification systems utilize a token presented by a user as a factor that is either entered manually or automatically into a token reader. Examples of tokens include PIN codes and proximity cards. By contrast, biometric identification systems use biometric factors, most commonly fingerprints. Fingerprints have long been recognized as a unique biological topography that is difficult to counterfeit, is readily accessible, does not significantly change over time, and can effectively be converted into a biometric template that functions as a digital signature specific for each individual user. Most biometric identification systems are automatic fingerprint identification systems, or AFIS.

SUMMARY OF THE INVENTION

The current invention is a method of augmenting the capabilities of an established, token-based identification system and increasing the level of security available by introducing at least one biometric factor, preferably a fingerprint. In the token-based identification system, when a token reader acquires a token factor from a user, the token reader transmits the acquired token factor information through a data stream to a control panel. The control panel is capable of matching or rejecting the acquired token factor, resulting in positive identification of an authorized user, or rejection of an unidentifiable user, respectively. In an ACS, the control panel then initiates an electronic signal that allows the authorized user to access a secured property, such as a building, parking garage, phone, computer, database, financial account, or other protected objects, places or information stores.

The augmentation method of the present invention couples a biometric identification system to an established token-based identification system in order to increase the level of security by preventing access via the token-based identification system until the biometric factor is matched to positively identify an authorized user at the level of a biometric search engine component. In all embodiments of the augmentation method of the present invention, the control panel of the established token-based identification system remains in a substantially unaltered state.

BRIEF DESCRIPTION OF THE DRAWINGS

The drawing FIGURE represents an ACS that has been enhanced by the most preferred biometric factor augmentation method of the present invention.

DETAILED DESCRIPTION OF THE INVENTION

The numerous identification systems in use today contain so many variations, complexities, and customized properties that it would be nearly impossible to address each one individually. Fortunately, the biometric factor augmentation method of the present invention does not require an understanding of or specificity to any particular identification system because one common denominator of all identification systems is a token reader that transmits a data stream. The data stream is usually transmitted directly to an input on a control panel that is linked to a database for data match analysis. Once the control panel obtains a match, an electronic signal is initiated, usually for the purpose of enabling an authorized user to access secured property. The biometric factor augmentation method of the present invention is, most preferably, coupled in series to an established identification system by creating a splice in the data stream. At the splice, a biometric identification system is "wedged" into the data stream. This biometric wedge architecture may be spliced into virtually any existing identification system.

A token reader is definable as a device that a user physically interacts with when seeking access to a secured property. Most token readers can be categorized as either a keypad or a card reader. A user interacts with a keypad by manually typing in a personal identification number (PIN), a personal password, or other information that may be used by the identification system resulting in determination of appropriateness of user access. A card reader automatically reads a user supplied token containing an information key that the card reader is programmed to recognize, such as a mag-stripe card, proximity card, Wiegand card, smartcard or barcode. For higher security, scanners capable of reading biological characteristics of the user, such as fingerprints or patterns in the face, voice, iris or retina, are utilized along side or in place of token readers. The information provided by a user to a token reader is reduced to an acquired token factor that is transmitted through a data stream to the control panel of an identification system.

The data stream on many identification systems is a Wiegand interface because so many established token readers are Wiegand input devices. It is understood that there are alternative interfaces and the method of the present invention is not limited to use with a Wiegand interface. The Wiegand interface uses a five wire Wiegand connection which, by pin number and wire color, have the following signals: one green carries the "DATA 0" signal; two white carries the "DATA 1" signal; three red carries+VDC, usually supplied by the control panel; four black carries ground; and five brown is for an LED. The Wiegand connection carries the data stream from a reader to the control panel. The biometric factor augmentation method of the present invention interrupts the Wiegand connection at some point between the token reader and the control panel, as will be described later.

The control panel is where the actual authentication process, or data match analysis, occurs. The control panel accesses a database that holds all of the stored token factors, usually a collection of passwords and/or codes. The stored token factors in the database are usually entered through a process known as enrollment. A control panel is able to compare an acquired token factor received from the data stream to at least a selected portion of the database to determine if there is a stored token factor that matches the acquired token factor received. A match occurs when an acquired token factor presented by an authorized user is matched with a stored token factor in the database.

In the event there is a match, the control panel transmits an electronic signal that, in the case of an ACS, allows an authorized user to access secured property. The electronic signal allows authorized users to enter, take or otherwise access secured property. The electronic signal may, for example, power a door latch so a user can enter a building, give a user access to an account or electronic file, or even allow a user to check-out a library book.

The most preferred embodiment of the biometric factor augmentation method of the present invention, as shown in the FIGURE, allows the data stream 2 to be intercepted by a biometric reader 4 at a splice somewhere along the path of the data stream. Everything in the FIGURE between line 3—3 and the top of the drawing sheet represents the established token-based identification system, while everything between line 3—3 and the bottom of the drawing sheet represents the splice and the biometric factor augmentation method. At the point of interception, the data stream path is broken so that there is an input splice end 6 and an output splice end 8. The initial path of the data stream 2 originates from the token reader 10 and terminates at the input splice end 6. The input splice end 6 connects to the biometric reader 4 as an input. The final path of the data stream 2 originates from the output splice end 8 and terminates at the control panel 12. The output splice end 8 also connects to the biometric reader 4, but as an output. The biometric reader 4 essentially blocks the data stream 2 at the input splice end 6 so that the data stream cannot travel to the control panel 12 until the biometric reader retransmits, or unblocks, the data stream at the output splice end 8. Normally, but not necessarily, the spliced connection that creates an electronic gate between the token reader 10 and the control panel 12 does not alter the data stream 2, but delays transmission until a supplemental authentication process has been successfully performed.

When the biometric reader 4 receives a data stream 2 from a token reader 10 at the input splice end 6, the biometric reader starts the biometric scanning process by prompting the user to place their finger, or other readable biometric structure, on the biometric reader. After scanning the biometric, the biometric reader 4 creates a digital inquiry template that is transmitted to a biometric search engine 14. The biometric search engine 14 has a database that is created by a new user enrollment process that identifies a biometric template, such as the minutiae of a fingerprint, and creates a digital enrollment template that is stored in the search engine's database. Biometric factors are almost always stored as digital templates. The biometric search engine 14, such as a PC that is part of an AFIS, then compares the inquiry template to one or more enrollment templates stored in the search engine's database. If an enrollment template matches the inquiry template, an authentication code is transmitted back to the biometric reader 4. The biometric reader then retransmits the data stream 2 at the output splice end 8, which may be modified or unmodified. The control panel 12 may then analyze any other factors that remain a part of the token-based identification system's protocol. If the biometric authentication system does not positively identify an authorized user, the biometric reader may signal to the control panel 12 that there is an unidentifiable user. In the case of an ACS, the unidentifiable user is denied access to the secured property.

Ideally, the biometric search engine 14 is a PC that receives an acquired biometric inquiry template through a parallel port 16 that is connected to the biometric reader 4. Multiple biometric readers 4 may be linked together, or daisy-chained, through parallel port connections 16 so that the biometric readers are connected to a single parallel port connection on the PC. The PC is additionally connected to the biometric reader 4 by a communication link 18, usually a serial port, that is used to transfer information the biometric reader receives at the input splice end 6, and also to transmit information from the PC to the biometric reader that will then enter the output splice end 8 and be transmitted to the control panel 12. The control panel 12 transmits the electronic signal 20 that allows an authorized user to access a secured property by, for instance, actuating a door strike 22. Again, it is understood that the numerous identification systems available have established suitable ports and connectors that may vary from the example provided herein, but these differences do not detract form the method of augmentation of the present invention.

The biometric authentication system's search engine can use the data stream's token factor information to speed the biometric factor matching process. The biometric search engine includes factor information that is equivalent to the token-based identification system's database. During the user enrollment process, a user supplies their stored token factor so that the biometric search engine can associate an established user's stored token factor with a their enrollment template. By this method, the biometric search engine need only compare the inquiry template to that enrollment template associated with the user's stored token factor.

By example, using a token-based identification system, a first user normally typed the word "THUMB" onto a keypad in order to access a secured area. If the system were augmented with a biometric factor according to the present invention, the first user would need to go through a biometric enrollment process where the first user would type the word "THUMB" and present her finger to a biometric reader to create an enrollment template. Later, when the first user seeks access to a secured area, she will first type the word "THUMB" onto the keypad, as before. The password is transmitted through the data stream to the input splice end where the data stream signal triggers the biometric reader to prompt her to place her finger on a scanner. A scan is completed to create an inquiry template. The biometric search engine then compares the inquiry template only with the group of enrollment templates associated with the password "THUMB." Because there are probably very few people that have the same password, the matching process is very fast. If a match is found, the password "THUMB" is allowed to be retransmitted at the output splice end so that the old token-based identification system can confirm that the first user is still authorized to enter the secured area. The control panel independently makes a decision about the factor information provided by the token reader, just as the token-based identification system did before being augmented.

For higher security systems that are designed to specifically identify an individual based on the factor information presented to the token reader, that token factor information is transmitted to the biometric reader so that the biometric search engine can retrieve a single enrollment template associated with that individual's factor information. The retrieved enrollment template is compared to the scanned inquiry template in a one-to-one comparison. If there is a match, then the token factor information that was blocked re-enters the data stream at the output splice end.

In any case where there is not an enrollment template that matches the inquiry template, the biometric identification system may instruct the biometric reader to prompt the user to perform a second scan. If a second scan also fails to produce a match, the data stream may either be modified to include an alert code so that the control panel knows that an unidentifiable user is present, or the data stream may just be blocked. Alternatively, an alert code may be transmitted to notify security that there is a problem, or any other appropriate measure. An alert code, if used, enters the output splice end and, preferably, the alert code will mimic a code normally transmitted by the token reader when access to a secured area is to be denied.

An alternative method of augmenting a token-based identification system is a method of bypassing the token-based identification system, if desired. The bypass method has the biometric identification system spliced into the data stream, in parallel, without ever blocking any information transmitted by the token reader. When the token reader transmits factor information, the biometric reader does not prompt the user for anything. The factor information is ignored by the biometric reader and transmitted straight to the control panel. The user may, however, opt to use the biometric reader instead of the token reader. If the user chooses to use the biometric reader, a cold search is performed. If the cold search finds a match, stored token factor associated with the matched biometric factor is transmitted from the biometric reader, through the splice, to the control panel. The control panel views information that mimics a data stream when in fact a biometric factor was verified and associated by the biometric search engine with the stored token factor associated with an enrollment template. The token-based identification system is unaffected by the bypass method, so a user is not required to stop using a familiar and trustworthy old token-based identification system. At any time, the token reader can be removed leaving a purely biometric, token-less identification system.

In yet another alternate embodiment of the present invention, the splice interrupts the token-based identification system after a decision has been made by the control panel to allow access and transmit the electronic signal that enables access. That electronic signal is blocked and used to prompt the biometric reader of a biometric identification system. As above, the biometric authentication system performs a cold search and makes an independent decision as to whether access should be allowed. If there is a match, then a new electronic signal is transmitted that actually allows access to the secured property.

While a preferred form of the invention has been described, it will be realized that alterations and modifications may be made thereto without departing from the scope of the following claims.

What is claimed is:

1. A biometric factor augmentation method for an established, token-based identification system comprising the steps of:

Splicing into a data stream between a token reader and a control panel of the token-based identification system such that there is an input splice end and an output splice end;

Installing a biometric identification system between the input splice end and the output splice end, the biometric identification system having at least a biometric reader and a biometric search engine;

Performing a biometric enrollment process to build a database of enrollment templates;

Connecting the input splice end so that the data stream may be transmitted from the token reader to the biometric reader;

Connecting the output splice end so that the data stream is capable of being re-transmitted from the biometric reader to the control panel;

Intercepting an acquired token factor transmitted by the token reader through the data stream, the point of interception being substantially where the input splice end connects to the biometric reader;

Utilizing the interception of the acquired token factor to electronically trigger the biometric reader to prompt a user to present a biological characteristic so that the biometric reader can perform a scan and create a biometric inquiry template;

Performing a data match analysis of the inquiry template against at least one enrollment template located in the database of enrollment templates accessed by the biometric search engine; and Re-transmitting the data stream through the output splice end when the data match analysis matches an authorized user's enrollment template to the acquired inquiry template.

2. The biometric factor augmentation method of claim 1 wherein the step of performing the biometric enrollment process is characterized by associating each user's enrollment template with the token factor assigned to them by the established, token-based identification system; and wherein the step of performing the data match analysis is characterized by using the intercepted acquired token factor to limit the data match analysis so that the biometric search engine only analyzes enrollment templates in the database that are associated with the acquired token factor received at the input splice end.

3. The biometric factor augmentation method of claim 2 further comprising the step of modifying the data stream before the biometric identification system re-transmits to the control panel.

4. The biometric factor augmentation method of claim 3 wherein the modified data stream contains an alert code when the control panel receives an acquired token factor from a user that the biometric identification system determines to by unidentifiable.

5. The biometric factor augmentation method of claim 1 further comprising the step of modifying the data stream before the biometric identification system re-transmits to the control panel.

6. The biometric factor augmentation method of claim 1 further comprising the step of rejecting an unidentifiable user by blocking the data stream at the output splice end when the data match analysis fails to match the inquiry template with an enrollment template.

7. The biometric factor augmentation method of claim 2 further comprising the step of rejecting an unidentifiable user by blocking the data stream at the output splice end when the data match analysis fails to match the inquiry template with an enrollment template.

8. The biometric factor augmentation method of claim 1 wherein the steps of connecting the input splice end and output splice end is characterized by disconnecting a Wiegand interface from the token reader and attaching it to the output splice end, and by connecting a new Wiegand interface from the token reader to the input splice end.

9. The biometric factor augmentation method of claim 1 wherein the step of installing the biometric identification system is characterized by installing an automatic fingerprint identification system.

10. The biometric factor augmentation method of claim 1 wherein the step of performing the data match analysis is characterized by a cold search that allows the biometric search engine to analyze the inquiry template against the entire database of enrollment templates.

11. A biometric factor augmentation method for a token-based identification system comprising the steps of:

Splicing into a data stream between an established token reader that reads token factors and a control panel of the token-based identification system;

Removing the established token reader from the identification system;

Installing a biometric identification system at the splice, the biometric identification system at least having a biometric reader, a biometric search engine, and a built-in token reader;

Enrolling established users into the biometric identification system so that biometric enrollment templates are stored in a database and associated with stored token factors such that each established user's enrollment template is associated with a stored token factor previously assigned to said user;

Prompting an established user to input their token factor into the built-in token reader so that the built-in token reader can acquire their token factor;

Prompting the established user to present a biological characteristic to the biometric reader so that the biometric reader can perform a scan and create a biometric inquiry template;

Performing a data match analysis of the inquiry template against at least one enrollment template located in a database accessed by the biometric search engine;

Transmitting the acquired token factor through the data stream to the control panel when the data match analysis matches the inquiry template to an enrollment template.

12. The biometric factor augmentation method of claim 11 wherein the step of performing the data match analysis is characterized by using the acquired token factor to limit the data match analysis so that the biometric search engine only analyzes enrollment templates in the database that are associated with the acquired token factor received at the built-in token reader.

13. The biometric factor augmentation method of claim 12 further comprising the step of modifying the data stream if it is transmitting an acquired token factor associated with an unidentifiable user so that the control panel is alerted that there is an unidentifiable user present.

14. The biometric factor augmentation method of claim 11 further comprising the step of modifying the data stream if it is transmitting an acquired token factor associated with an unidentifiable user so that the control panel is alerted that there is an unidentifiable user present.

15. The biometric factor augmentation method of claim 11 wherein the step of installing the biometric identification system is characterized by installing an automatic fingerprint identification system.

16. The biometric factor augmentation method of claim 11 further comprising the step of rejecting an unidentifiable user by not transmitting a data stream at the splice when the data match analysis fails to match the inquiry template with an enrollment template.

17. The biometric factor augmentation method of claim 12 further comprising the step of rejecting an unidentifiable user by not transmitting a data stream at the splice when the data match analysis fails to match the inquiry template with an enrollment template.

18. The biometric factor augmentation method of claim 11 wherein the step of performing the data match analysis is characterized by a cold search that allows the biometric search engine to analyze the inquiry template against the entire database of enrollment templates.

19. A biometric factor augmentation method for a token-based identification system comprising the steps of:

Splicing into an electronic signal path between a token-based identification system and an entry device, the electronic signal path being capable of providing an electronic signal that actuates the entry device so that a user can access a secured property, the splice including an input splice end and an output splice end;

Installing a biometric identification system between the input splice end and the output splice end, the biometric identification system having at least a biometric reader and a biometric search engine;

Performing a biometric enrollment process to build a database of enrollment templates;

Connecting the input splice end so that the electronic signal may be transmitted from the token-based identification system to the biometric reader;

Connecting the output splice end so that the electronic signal is capable of being re-transmitted from the biometric reader to the entry device;

Intercepting the electronic signal transmitted by the token-based identification system;

Utilizing the intercepted electronic signal to electronically trigger the biometric reader to prompt a user to present a biological characteristic so that the biometric reader can perform a scan and create a biometric inquiry template;

Performing a data match analysis of the inquiry template against the enrollment templates in a database of the biometric search engine; and Re-transmitting the electronic signal through the output splice end when the data match analysis matches an enrollment template to the inquiry template.

20. The biometric factor augmentation method of claim 19 wherein an alert signal is sent to the token-based identification system if the data match analysis fails to identify the user.

21. A biometric factor augmentation method for an established, token-based identification system comprising the steps of:

Splicing into a data stream between a token reader and a control panel of the token-based identification system;

Installing a biometric identification system at the splice in parallel with the token reader, the biometric identification system having at least a biometric reader and a biometric search engine;

Performing a biometric enrollment process to build a database of enrollment templates that are associated with stored token factors;

Prompting a user to present a biological characteristic so that the biometric reader can perform a scan and create a biometric inquiry template;

Performing a data match analysis of the inquiry template against the database of enrollment templates; and Transmitting a stored token factor that is associated in the database with that enrollment template that is matched to the inquiry template; and Allowing the token reader to send an acquired token factor directly to the control panel of the token-based identification system.

22. The biometric factor augmentation method of claim 21 wherein the step of installing the biometric identification system is characterized by installing an automatic fingerprint identification system.

23. The biometric factor augmentation method of claim 21 further comprising the step of allowing the user to choose which reader, the biometric reader or the token reader, she will use.

* * * * *